United States Patent [19]
Popp

[11] Patent Number: 5,379,546
[45] Date of Patent: Jan. 10, 1995

[54] BED DIVIDER

[76] Inventor: Richard Popp, 1505 Rue Reynard Rd., Menasha, Wis. 54952

[21] Appl. No.: 921,738

[22] Filed: Jul. 30, 1992

[51] Int. Cl.⁶ ............................................. A01G 1/00
[52] U.S. Cl. ........................................... 47/33; 404/7
[58] Field of Search ............... 52/102; 47/33; 404/7, 404/8

[56] References Cited

U.S. PATENT DOCUMENTS

| | | | |
|---|---|---|---|
| 1,373,827 | 4/1921 | Nelson et al. | 47/33 |
| 1,509,860 | 9/1924 | Cannady | 404/8 |
| 3,041,781 | 7/1962 | Richter | 47/33 |
| 3,314,193 | 4/1967 | Chancellor | 47/33 |
| 3,487,600 | 1/1970 | Greene | 52/102 |
| 3,495,352 | 2/1970 | Sbare | 47/33 |
| 3,676,952 | 7/1972 | Watts | 47/33 |
| 4,281,473 | 8/1981 | Emalfarb et al. | 47/33 |
| 4,831,776 | 5/1989 | Fritch | 47/33 |
| 4,863,307 | 9/1989 | Jones | 404/7 |
| 5,048,241 | 9/1991 | Gavin, Jr. | 47/33 |
| 5,212,917 | 5/1993 | Kurtz et al. | 47/33 |

FOREIGN PATENT DOCUMENTS 2336535  2/1975  Germany ......................... 47/33
2232052 12/1990 United Kingdom ............. 47/33

OTHER PUBLICATIONS

Exhibits 1, 2, and 3.

*Primary Examiner*—Ramon S. Britts
*Assistant Examiner*—Joanne C. Downs
*Attorney, Agent, or Firm*—Donald Cayen

[57] ABSTRACT

A bed divider comprises a tubular separation member and a thin flange. The flange is joined to the tubular separation member and is tangent thereto. The flange is cut transversely with several scissors cuts or notches to create a number of tabs. Adjacent tabs can be overlapped along the separation member to enable the side of the separation member adjacent the tabs to be bent into a concave curve. In a modified embodiment, a short neck is interposed between the flange and the separation member. The neck lies in a plane that is at an angle to the plane of the flange and that passes toward the longitudinal centerline of the separation member. The bed divider is installed by laying the flange horizontally on the ground and staking it in place.

7 Claims, 1 Drawing Sheet

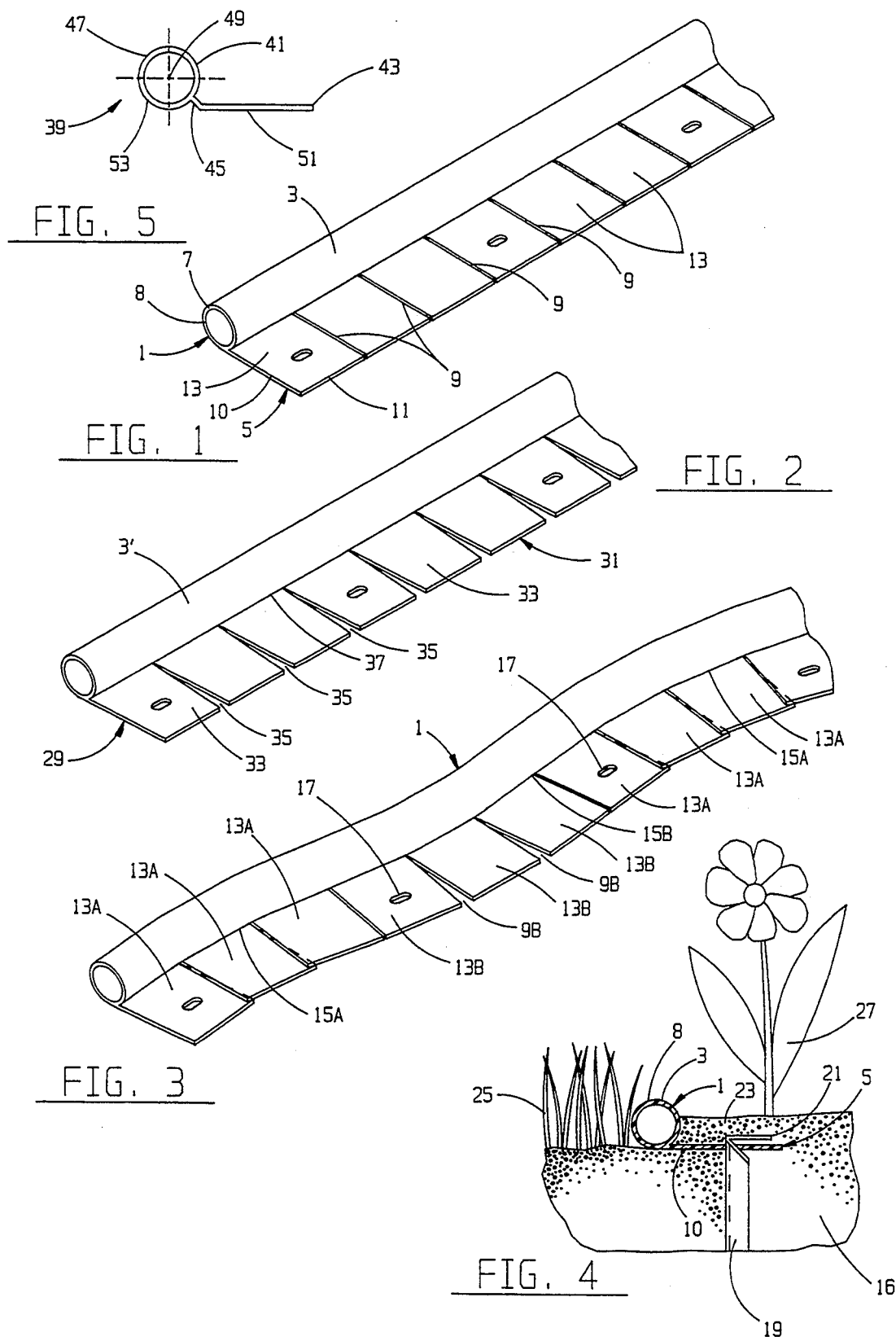

BED DIVIDER

BACKGROUND OF THE INVENTION

1. Field of the Invention

This invention pertains to groundskeeping, and more particularly to apparatus for separating different areas of lawns and gardens.

2. Description of the Prior Art

Various types of edgings have been developed to provide borders between adjacent portions of lawns, gardens, and wild areas. The edgings are intended to reduce the labor associated with creating and maintaining neat and attractive demarcations between different types of planted areas. At the same time, the edgings enhance the appearance of multi-use landscapes.

A common design of edging comprises a rather flexible elongated tube to which is integrally joined a generally planar web. The plane of the web passes through the longitudinal centerline of the tube. The web may be flat, or it may be formed with ridges or projections that extend angularly from it. The web is buried in a trench dug in the ground such that the tube lies horizontally along the ground surface and the web is located vertically in the trench under the tube. Stakes may be driven diagonally through the web at intervals into the adjacent ground. When the trench is backfilled, the soil in contact with the web ridges or projections, along with the stakes, helps to prevent the edging from heaving upwardly with the changing seasons. Prior edgings of the aforedescribed type are marketed by Oly-Ola Sales, Inc. of Villa Park, Ill., and by Drainage Industries of Appleton, Wis. Another example of a prior edging may be seen in U.S. Pat. No. 4,644,658.

A disadvantage of the edgings described above is that digging and backfilling trenches requires the expenditure of considerable time and effort. Further, the disturbed soil tends to resettle unevenly, thus detracting from the attractiveness the edgings are intended to provide. In some applications, plastic film or fabric is staked to the ground along with the edging. Eventually the plastic pulls away from the edging web, leaving a gap therebetween. The gap soon fills with dirt, grass, and weeds.

Despite stakes and the ridges or projections on their vertical webs, the prior edgings do heave within the ground. Heaving causes the tubes to rise above the ground, where they are subject to damage from lawn mowers and the like. In addition, the webs become exposed to detract from the attractiveness of the edgings. To correct the heaving, the trench must be redug and the stakes removed and redriven to place the edgings back at their proper locations.

Somewhat similar to the prior tubular edgings are generally L-shaped edgings having a flat vertical wall with a horizontal web. A brick paver marketed by Oly-Ola Sales, Inc. of Villa Park, Ill., is one example of such an edging. Another example is an edging advertised by Kamb Raseneinfassung of Germany. The horizontal webs of the foregoing products can be notched to enable the vertical walls to bend. The horizontal webs are provided with holes through which stakes or the like can be inserted and driven into the ground to hold the edgings in place. The Oly-Ola brick paver and the Kamb Raseneinfassung edging require that the soil be graded to a level condition to properly support the horizontal webs. Considerable labor must therefore be expended to install those edgings.

Thus, a need exists for improvements in lawn and garden edgings.

SUMMARY OF THE INVENTION

In accordance with the present invention, a bed divider is provided that is exceptionally simple and economical to install between different yard and garden areas. This is accomplished by constructing the bed divider with an elongated separation member and a flat flange that extends tangentially from the separation member.

The separation member is preferably a round tube with a predetermined wall thickness. The flange may have the same thickness as the tube wall. The flange blends tangentially into the tube wall.

To enable the bed divider to conform to curved borders, the flange is cut transversely at regular intervals from the flange free edge to the separation member. Scissors cuts are sufficient, although generally V-shaped notches are also satisfactory. The flange is thus divided into a number of tabs. Some tabs are provided with holes therethrough.

The bed divider is used by merely laying the flange flat on the ground with the separation member facing upward. The bed divider is arranged such that the separation member forms the desired border between the areas of the lawn or garden to be separated. The bed divider is bent in the plane of the flange by either overlapping adjacent tabs along the scissors cuts or by spreading the tabs apart, depending on whether the side of the separation member adjacent the tabs makes a concave or convex curve. Stakes are pushed through the tab holes and into the ground to keep the bed divider in place. Then the flange is covered with soil, mulch, or decorative material.

In a modified embodiment of the present invention, a short neck is interposed between the separation member and the flange. The flange is flat and lies in a plane that is tangent to the separation member wall. The plane of the neck makes an angle to the plane of the flange, and the plane of the neck passes generally through the longitudinal centerline of the separation member. The installation and use of the modified bed divider is the same as the version in which the flange connects directly to the separation member.

The present invention provides an inexpensive and attractive divider that is easily installed on the ground to create a desired border without requiring a trench. Once installed, the bed divider remains in place along the desired contour without further attention.

Other advantages, benefits, and features of the present invention will become apparent to those skilled in the art upon reading the detailed description of the invention.

BRIEF DESCRIPTION OF THE DRAWINGS

FIG. 1 is a perspective view of the bed divider of the present invention.

FIG. 2 is a perspective view of a modified embodiment of the present invention.

FIG. 3 is a perspective view of the bed divider arranged along a typical curved border.

FIG. 4 is a cross-sectional view on an enlarged scale of a typical installation of the bed divider.

FIG. 5 is an end view on an enlarged scale of a bed divider having a modified cross-section.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hmreto.

Referring to FIGS. 1 and 3, representative portions of a bed divider 1 are illustrated that include the present invention. The bed divider is particularly useful for separating two areas of lawns, gardens, and the like. However, it will be understood that the invention is not limited to landscaping applications.

The bed divider 1 is comprised of an elongated separation member 3 and a flange 5. Although the separation member 3 may have any desired cross-section, such as rectangular or square, I prefer a circular cross-section. In the illustrated construction, the circular separation member is hollow so as to form a tube having a wall 7. The wall 7 has an outer surface 8.

The flange 5 is formed as a thin flat piece of material. The flange is integral with the tube wall 7, and the bottom surface 10 of the flange is tangent to the tube wall outer surface 8.

To provide flexibility of the bed divider 1 within the plane that contains the flange 5, the flange is cut transversely with longitudinally spaced scissors cuts 9. The scissors cuts 9 extend between the flange free edge 11 and the separation member 3, thereby creating a number of tabs 13. The individual tabs 13 enable the tube to be bent into desired contours. For example, adjacent tabs can overlap at the cuts 9, as is shown by tabs 13A to enable the side 15A of the tube adjacent the tabs 13A to be bent into a concave curve. Similarly, adjacent tabs, such as tabs 13B, can be spread apart at the cuts 9B to enable the side 15B of the tube adjacent the tabs 13B to be bent into a convex curve. In that manner, the bed divider 1 can be bent into practically any desired shape to suit the particular border required.

A satisfactory material for the bed divider 1 is a tough polyethylene plastic material. A separation member 3 in the form of a round tube having a one inch outer diameter and a wall thickness of 0.06 inches works very well. The flange 5 has a preferred thickness of 0.06 inches and a width of 2.13 inches. The scissors cuts 9 may be made along the flange approximately every three inches of its length. The bed divider can be extruded in a continuous length and then cut transversely into desired lengths for packaging and shipping.

To retain the bed divider 1 in place on the ground 16, FIG. 4, some of the tabs 13 are formed with holes 17. The holes are preferably oval in shape to receive conventional stakes 19. FIG. 4 shows a bed divider stake in place on the ground 16; for clarity, the head 21 of the stake 19 is shown spaced from the flange 5. In practice, however, the stake head 21 is in contact with the flange. After the bed divider 1 is staked in its desired place along the ground 16, the flange 5 and stakes 19 are covered with a layer 23 of soil, mulch, or related material. The separation member 3 remains exposed to provide a neat and effective border between two areas, such as a lawn 25 and a flower garden 27.

Turning to FIG. 2, an alternate bed divider 29 according to the present invention is shown. The bed divider 29 has a separation member 3', which preferably is a round tube. The bed divider 29 further has a flange 31 that is divided into a number of tabs 33 by notches 35. The notches 35 are V-shaped. The notches enable the side 37 of the tube 3' adjacent the tabs 33 to be bent into a concave curve without requiring the tabs to overlap. In all other respects, the construction and use of the bed divider 29 is substantially identical to that of the bed divider 1 described previously.

FIG. 5 shows an end view of a further modified bed divider 39. The bed divider 39 has a tubular separation member 41 and a flange 43. The plane of the flange bottom surface 51 is tangent to the outer surface 53 of the tubular separation member 41. The flange 43 is integrally connected to the tube 41 by a short neck 45. The neck 45 lies in a plane that is at an angle to the plane of the flange 43, and the plane of the neck extends toward the longitudinal centerline 49 of the tube. The flange 43 is formed either with scissors cuts or V-shaped notches similar to the cuts 9 and notches 35 of the bed divider 1 shown in FIG. 1 and 3 or the bed divider 29 shown in FIG. 2. The use and installation of the bed divider 39 is the same as that of the bed dividers 1 and 29.

Thus, it is apparent that there has been provided, in accordance with the invention, a bed divider that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A bed divider for above-ground use comprising:
   a. a flexible elongated separation member having a closed circular tubular cross section with an outer surface and defining a longitudinal axis, the separation member being selectively bendable such that the longitudinal axis thereof is straight or defines a selected continuous reverseable smooth curve that defines a first plane; and
   b. an elongated thin planar flange extending unidirectionally from the separation member and lying in a second plane that is parallel to the first plane, the flange having a free edge and a second edge that is integrally joined to the separation member, the flange having opposed top and bottom surfaces, the flange bottom surface extending tangentially into the separation member outer surface, the flange bottom surface being placeable horizontally on the surface of the ground with the separation member lying above the ground, the flange defining a plurality of generally straight cuts that extend from the flange free edge to the separation member to thereby form a plurality of tabs, adjacent tabs having respective facing surfaces formed by the cuts that are spaced apart when the separation member longitudinal axis is straight.

2. The bed divider of claim 1 wherein:
   a. the separation member circular tube is made of a flexible polyethylene material and has an outer diameter of approximately one inch and a wall thickness of approximately 0.06 inches;
   b. the flange is made of a flexible polyethylene material and has a width of approximately 2.13 inches and a thickness of approximately 0.06 inches with the flange blending into the tubular wall of the separation member; and c. the flange cuts are spaced approximately three inches apart along the flange.

3. A bed divider for forming a border along the ground comprising:

a. a flexible elongated separation member having an outer surface and defining a longitudinal centerline;

b. a thin elongated planar flange having a free edge and a second edge and opposed top and bottom surfaces, the flange bottom surface lying in a plane that is tangent to the separation member outer surface; and c. an elongated neck interposed between the separation member and the flange second edge to integrally connect the flange to the separation member, the neck lying in a plane that makes an angle to the plane of the flange and that extends toward the longitudinal centerline of the separation member, the flange bottom surface being placeable on the ground with the neck and the separation member being above the ground to create a border between adjacent areas of the ground.

4. The bed divider of claim 3 wherein the bed divider is formed with a plurality of scissors cuts that extend transversely through the flange and the neck between the flange free edge and the separation member to thereby form a number of tabs, adjacent tabs being overlappable at the scissors cuts to enable the side of the separation member adjacent the tabs to be bent into a concave curve.

5. The bed divider of claim 4 wherein:

a. the separation member is a circular tube having an outer diameter of one inch and a wall thickness of approximately 0.06 inches;

b. the flange has a width of approximately 2.13 inches and a thickness of approximately 0.06 inches with the flange blending into the tubular wall of the separation member; and c. the neck has a width of approximately 0.06 inches and a thickness of approximately 0.06 inches.

6. A bed divider comprising:

a. a flexible elongated separation member having a generally ovular cross section with an outer surface and defining a longitudinal axis, the separation member being selectively bendable such that the longitudinal axis thereof is straight or defines a selected smooth continuous reverseable curve that lies in a first plane; and b. an elongated thin planar flange having a free edge and a second edge that is integrally joined to the separation member and lies in a second plane parallel to the first plane, the flange having opposed top and bottom surfaces, the flange bottom surface extending tangentially into the separation member outer surface, the flange bottom surface being placeable on the surface of the ground with the separation member being above the surface of the ground, wherein the flange is formed with a plurality of straight scissors cuts that extend from the flange free edge to the separation member and that are generally perpendicular to the separation member longitudinal axis when the separation member longitudinal axis is straight to thereby form a number of tabs, adjacent tabs being spaced apart when the separation member longitudinal axis is straight and being overlapped when the separation member adjacent the tabs is bent into a smooth continuous concave curve.

7. A method of erecting a border between adjacent areas of a lawn and garden or the like comprising the steps of:

a. providing a flexible elongated separation member defining a longitudinal axis and having an outer surface and a thin planar flange joined to the separation member and having a bottom surface that lies in a first plane that is tangent to the separation member outer surface;

b. cutting a plurality of thin straight transverse cuts in the flange to form a number of spaced apart tabs;

c. placing the flange horizontally on the surface of the ground;

d. bending the separation member into a selected continuous smooth reverseable curve having a portion that is concave along the side of the separation member adjacent the tabs such that the separation member longitudinal axis defines a second plane that is parallel to the first plane, and simultaneously overlapping adjacent tabs along the flange cuts at the concave portion of the separation member; and e. staking the tabs to the ground and leaving the separation member above the surface of the ground.

* * * * *